No. 815,396. PATENTED MAR. 20, 1906.
F. J. WOLFF.
SACK CLEANING MACHINE.
APPLICATION FILED JULY 18, 1905.

2 SHEETS—SHEET 1.

Witnesses
Frank R. Glow
H. C. Rodgers

Inventor
F. J. Wolff
By George H. Thorpe
atty.

No. 815,396. PATENTED MAR. 20, 1906.
F. J. WOLFF.
SACK CLEANING MACHINE.
APPLICATION FILED JULY 18, 1905.

2 SHEETS—SHEET 2.

Witnesses
Frank R. Glow
H. C. Rodgers

Inventor
F. J. Wolff
By George J. Thorpe
Atty.

UNITED STATES PATENT OFFICE.

FREDRICK JOHN WOLFF, OF KANSAS CITY, MISSOURI.

SACK-CLEANING MACHINE.

No. 815,396.　　　Specification of Letters Patent.　　　Patented March 20, 1906.

Application filed July 18, 1905. Serial No. 270,239.

*To all whom it may concern:*

Be it known that I, FREDRICK JOHN WOLFF, a citizen of the United States, residing at Kansas City, in the county of Jackson and State of Missouri, have invented certain new and useful Improvements in Sack-Cleaning Machines, of which the following is a specification.

This invention relates to sack-cleaners, and has for its object to produce a machine for quickly and efficiently cleaning the sacks in which flour, cement, or other products have been stored.

To this end the invention consists in certain novel and peculiar features of construction and organization, as hereinafter described and claimed, and in order that it may be fully understood reference is to be had to the accompanying drawings, in which—

Figure 1:
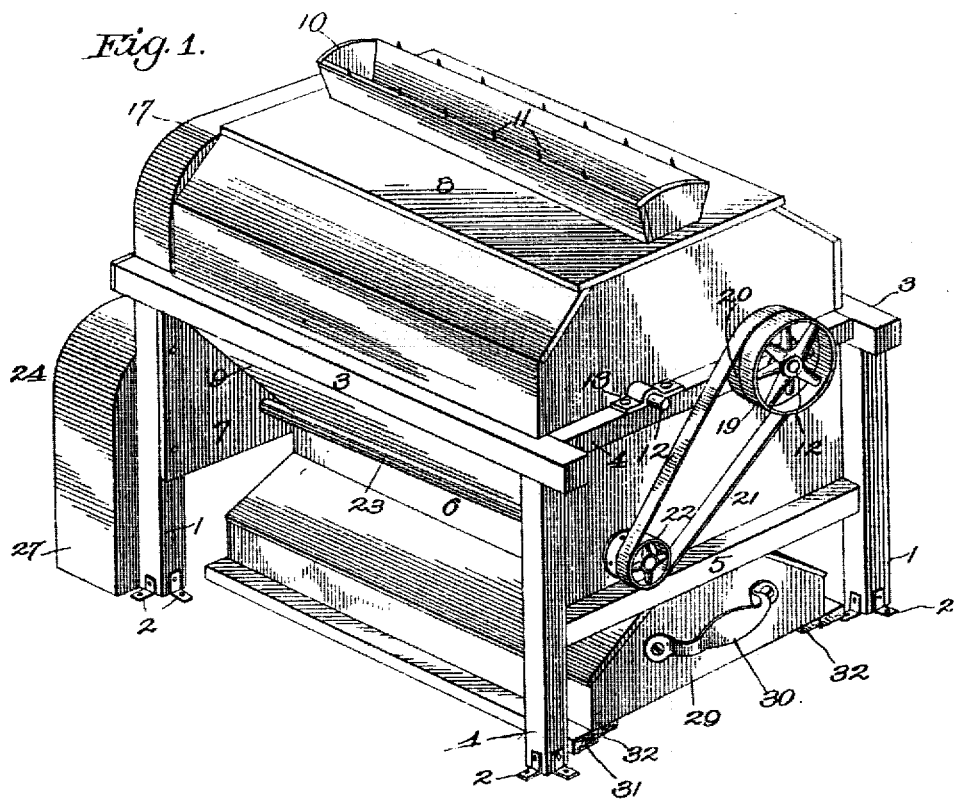
Figure 2:
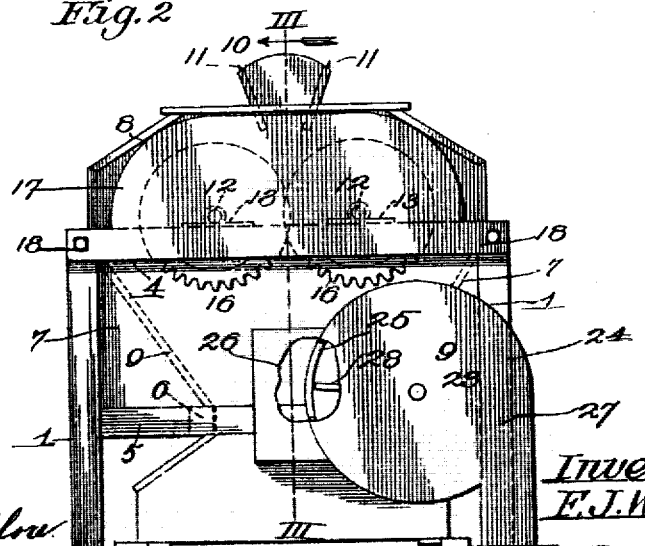
Figure 3:
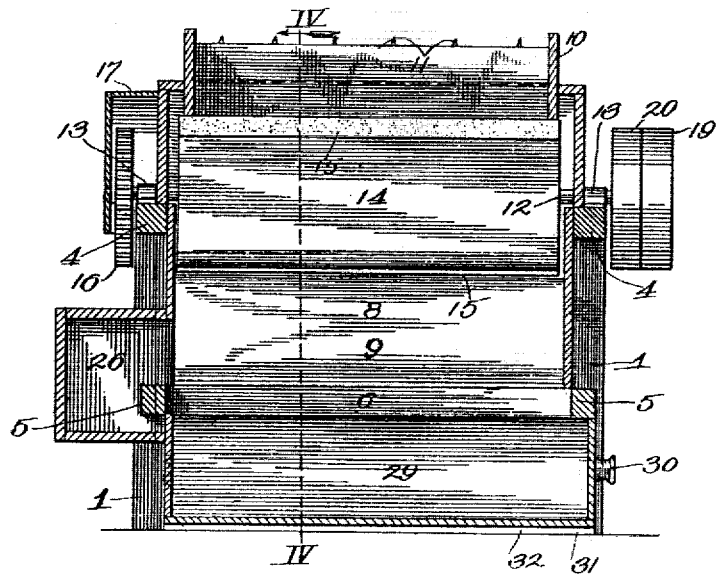
Figure 4:
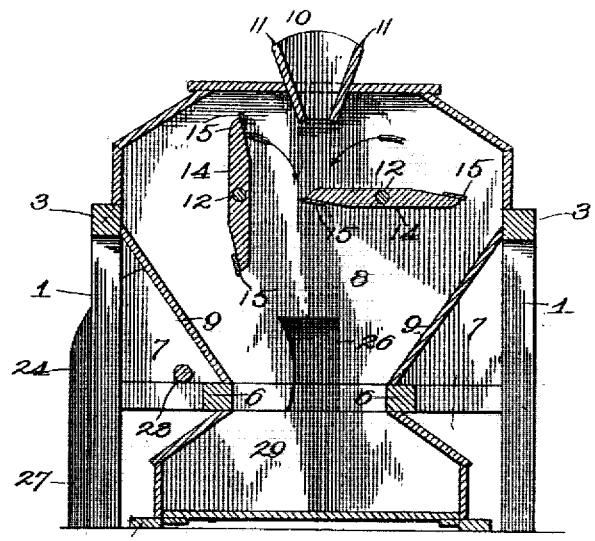

Figure 1 is a perspective view of a sack-cleaning machine embodying my invention. Fig. 2 is a rear end view of the same. Fig. 3 is a central vertical longitudinal section on the line III III of Fig. 2. Fig. 4 is a transverse section on the line IV IV of Fig. 3.

In the said drawings, 1 indicates four legs arranged upright in a rectangular relation and secured, as at 2 or otherwise, to the support upon which they are erected.

3 indicates longitudinal sills connecting the upper ends of the uprights, and 4 end sills connecting sills 3, 5 indicating cross-bars connecting the legs 1 at a suitable distance above the floor.

6 indicates a pair of longitudinal bars connecting the cross-bars 5, the cross-board 7 connecting the rear legs.

8 indicates a casing disposed within and secured rigidly to the framework composed of parts 1 to 7, inclusive, the side walls 9 of said casing tapering downwardly to the inner edges of bars 6, and 10 indicates a narrow hopper extending longitudinally of and depending through the top of and into the casing, the side walls of the hopper having upwardly-projecting pins 11 for a purpose hereinafter explained.

12 indicates a pair of parallel longitudinally-extending shafts journaled in bearings 13, secured on the sills 4 of the framework, and secured rigidly on said shafts within the casing are a pair of rotary beaters 14, provided at their edges with projecting rubber or other flexible strips 15 in order that said flexible or yielding edges may come in contact with and beat the sacks without danger of tearing them, as might occur if the beaters were not provided with said yielding edges.

16 indicates a pair of intermeshing gear-wheels mounted on the rear ends of shafts 12 and almost wholly covered by a housing 17, secured to the framework, as at 18.

19 indicates a belt-wheel secured on the front end of one of the shafts 12 and adapted to be driven by a suitable drive-belt, (not shown,) and 20 indicates a second belt-wheel on said shaft, connected by a belt 21 with the belt-wheel 22, secured rigidly on the front end of a longitudinal shaft 23, journaled in the front wall of the casing and in cross-board 7 at the rear end of the casing, said shaft extending rearwardly through the fan-casing 24, having a peripheral opening 25 communicating with a chamber 26, which opens into the rear and lower end of the casing, the discharge-spout 27 of the fan-casing leading through the floor or to any other suitable point for the purpose of drawing the dust to the dust-room, (not shown,) the fan 28, of which one blade only appears, (see Fig. 2,) being of any suitable or preferred type and secured on the shaft 23 within the fan-casing.

Arranged below the longitudinal bars 6 is a slide-drawer 29, having a handle 30 at its front end, by which it may be drawn from under the casing. This drawer has its upper side open, and at such point is of about the same width as the contracted bottom of the casing, the walls of the drawer flaring downwardly, so that the drawer may be of comparatively large capacity. The drawer at its opposite edges rests upon the guide-bars 31, and is provided between said guide-bars with depending cleats 32, so as to guard against lateral movement and hold it always in proper relation to the casing above.

In the practical operation of the machine the sacks are fed down through the hopper into the casing until they come within the plane of action of the beaters, which are revolving at a high rate of speed in the direction indicated by the arrows, Fig. 4. The beaters therefore alternately strike the sack and feed it down into the casing until its upper end is caused to engage pins 11 of the hopper, said pins serving to prevent the sack from being fed entirely into the casing. This action of the beaters whips the sack around with great rapidity in the casing and in an exceedingly short space of time beats out of it the flour, cement, or other product which it may have originally been charged with. After the sack has been subjected to the action of the beaters for a fraction of a minute it is withdrawn and inverted and in such position is again fed down into the casing through the hopper, so that the originally upper end shall also be beaten and the flour or other product removed therefrom.

While the machine is in operation and the sacks are being beaten, the suctional action of the fan draws most of the flour or other product out through opening 26 and into the fan-casing, the latter discharging it through spout 27, a portion of the dust, presumably the heavier particles, falling into and accumulating in the drawer. At suitable intervals the drawer is pulled out and the accumulated flour, cement, or other product is removed. The drawer is then replaced and the machine is again ready for operation.

It will be observed on reference to Fig. 4 that the beater when horizontal extends through and beyond the plane of the opening in the bottom of the hopper and that the body of the beater is solid and unyielding, although it has a flexible strip along its edge. As a result of this arrangement and construction the sack is not merely brushed, but is given a firm square blow and is caused to swing from side to side, so that one beater leaves it disposed in the path of the other beater and the entire surface of the bag is subjected to the beating dirt-loosening action. The elastic edge of the beater cushions the blow just enough to prevent injury to the material of the sack without decreasing the effective force of the impact of the beater upon the sack.

Having thus described the invention, what I claim as new, and desire to secure by Letters Patent, is—

1. A sack-cleaning machine comprising a casing, a hopper in the top of the casing to permit the entrance of a sack into the casing, longitudinal shafts within the casing on opposite sides of the vertical plane of the hopper, rigid beater-plates secured longitudinally upon the said shafts, flexible strips secured upon the sides and projecting slightly beyond the longitudinal edges of said beater-plates to impinge against the suspended sack, and means for rotating the said shafts.

2. A sack-cleaning machine comprising a casing having downwardly-converging sides and an opening in its rear end, a hopper in the top of the casing provided with means for suspending a sack, a pair of longitudinal shafts journaled in the casing, intermeshing gears on the rear ends of said shafts, a driving-pulley on the front end of one of said shafts, rigid beater-plates secured longitudinally on said shafts and arranged to project through the vertical plane of the hopper, a third shaft mounted longitudinally in the hopper below the intergeared shafts and driven from one of said shafts, a fan on the rear end of said shaft, and a fan-casing inclosing the fan and extending over the opening in the rear end of the main casing.

In testimony whereof I affix my signature in the presence of two witnesses.

FREDRICK JOHN WOLFF.

Witnesses:
H. C. RODGERS,
G. Y. THORPE.